UNITED STATES PATENT OFFICE.

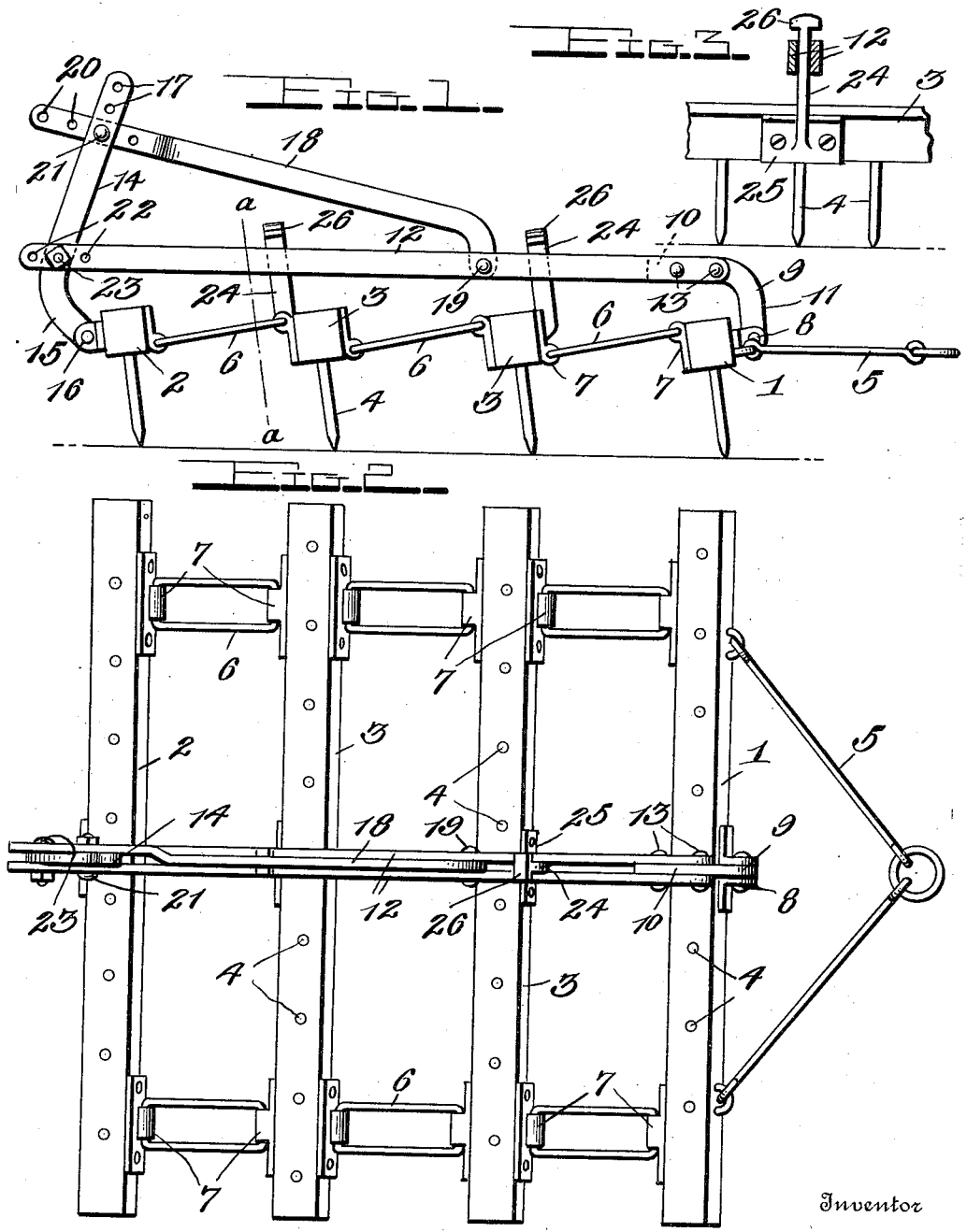

RAYMOND CLAUD PEGRIM, OF CEDAR HILL, TENNESSEE.

HARROW.

1,022,500.  Specification of Letters Patent.  Patented Apr. 9, 1912.

Application filed June 19, 1911. Serial No. 633,990.

*To all whom it may concern:*

Be it known that I, RAYMOND CLAUD PEGRIM, a citizen of the United States, residing at Cedar Hill, in the county of Robertson and State of Tennessee, have invented certain new and useful Improvements in Harrows, of which the following is a specification, reference being had to the accompanying drawings.
This invention relates to improvements in adjustable harrows and consists in the construction, combination and arrangement of devices hereinafter described and claimed.

In the accompanying drawings: Figure 1 is a side elevation of an adjustable harrow embodying my improvements; Fig. 2 is a plan of the same; and Fig. 3 is a detail sectional view on the plane indicated by the line *a—a* of Fig. 1.
The harrow is provided with a front bar 1, a rear bar 2 and a suitable number of intermediate bars 3. Each of the harrow bars is provided with suitable harrow teeth 4 and the front harrow bar is provided with a draft bridle 5 to which the double or swingletree is attached when the harrow is in use. The harrow bars are connected together by links 6, the ends of which are connected to the harrow bars, at points a suitable distance from the ends of the harrow bars by suitable eyes 7 which are formed on plates or castings which are bolted to the harrow bars. It will be observed upon reference to Fig. 1 of the drawings that the front end of each link is connected to the rear side of a harrow bar at a higher point than the rear end of the next link ahead so that a plane intersecting the connections between the ends of the link and harrow bars will be inclined to the latter and hence when the chains are under tension the harrow bars will be disposed in an inclined position as shown, so as to incline the harrow teeth forwardly and downwardly. To the front side of the center of the front harrow bar is pivotally connected, as at 8, the lower front end of a substantially crook-shaped link 9, comprising a straight arm 10 and a down-turned front arm 11. A pair of link bars 12 have their front ends secured as at 13 on opposite sides of the link 9 so that the arm 10 of said link is interposed between the said link bars and spaces them apart. An adjusting lever 14 has its lower end curved forwardly as at 15 and pivotally connected, as at 16, to the rear side of the rear harrow bar 2 at the center thereof. The said adjusting lever extends upwardly and is provided with a series of adjusting openings
17. The link arm 18 has its front end, which is down-turned, pivotally connected, as at 19, to the link bars and disposed between them. The said link arm is provided at its rear end with a series of adjusting openings 20 and a pivot 21 is inserted in one of said openings and also in one of the openings 17 of the lever 14 and hence the link bar is adjustably and pivotally connected to the adjusting lever. The link bars are provided near their rear ends with a series of adjusting openings 22. The adjusting lever is disposed between the link bars and a fulcrum bolt 23 thereof may be disposed in any of the adjusting openings 22 so as to predetermine the angle at which the harrow teeth shall operate, the connection of the link arm with the adjusting lever being also a factor in determining this angle. Each intermediate harrow bar is provided with a medially disposed upwardly extending arm 24 which passes upwardly between the link bars and is movable between and guided by the link bars. Each of the said arms has an inverted T-shaped base plate 25 at its lower end, which is bolted to the rear side of one of the intermediate harrow bars and is provided at its upper end with a lateral widened head 26, above the link bars, which serves as a stop device which, by bearing on the link bars, prevents the harrow bars from becoming entirely disconnected from the link bars.

While the links connect the harrow bars and hold them and the harrow teeth to their work and also hold the teeth at the required angle, the links, when the teeth of one of the harrow bars strike an obstruction, permit such harrow bar to move upwardly so as to clear the obstruction, and, hence, avoid being injured. The arms, which are loosely connected to and movable angularly and vertically in a vertical plane between the link bars, co-act with the link bars to keep the harrow bars in line and give the harrow or harrow section the required rigidity to enable it to do efficient work and also admit of the movement of the harrow bars to correspond with the inequalities of the ground and when passing over obstructions.

The various parts of my improved harrow or harrow section are extremely cheap, simple and strong and when any part becomes broken or injured it may be renewed or replaced by another at very slight cost.

Having thus described the invention what is claimed is:

In a harrow of the class described, the combination of a series of harrow bars, a link having a down-turned front end pivotally connected to the front harrow bar, a pair of link bars having their front ends secured to opposite sides of the said link, said link bars being spaced apart and extending rearwardly over the harrow bars, an adjusting lever fulcrumed to and disposed between the link bars, having its lower end pivotally connected to the rear harrow bar, the upper portion of the said adjusting lever being provided with a series of adjusting openings, a link arm pivotally connected at its front end between the pair of link bars and provided at its rear end with a series of adjusting openings, a pivot engaging one of the said openings and also one of the adjusting openings of the lever, links connecting the harrow bars flexibly together, and arms extending upwardly from the centers of the harrow bars and passing between and movable vertically and angularly in the space between the link bars, said arms having widened heads above the link bars for the purpose set forth.

In testimony whereof I hereunto affix my signature in the presence of two witnesses.

RAYMOND CLAUD PEGRIM.

Witnesses:
J. E. ADAMS,
J. S. ADAMS.

Copies of this patent may be obtained for five cents each, by addressing the "Commissioner of Patents, Washington, D. C."